United States Patent [19]

Hanon et al.

[11] Patent Number: 5,185,789
[45] Date of Patent: Feb. 9, 1993

[54] UNIVERSAL TELEPHONE HANDSET INTERFACE

[75] Inventors: David O. Hanon; Rickey R. Walker, both of Ringgold, Ga.

[73] Assignee: Plantronics, Inc., Santa Cruz, Calif.

[21] Appl. No.: 530,655

[22] Filed: May 30, 1990

[51] Int. Cl.⁵ .............................. H04M 1/60
[52] U.S. Cl. ................... 379/395; 379/387; 379/398; 379/441; 381/111
[58] Field of Search ............... 379/387, 395, 398, 441, 379/442, 447, 413, 396, 388, 61; 381/110, 111, 112, 113, 114

[56] References Cited

U.S. PATENT DOCUMENTS

| | | | |
|---|---|---|---|
| 2,891,110 | 6/1959 | Miller | 379/395 |
| 3,046,353 | 7/1962 | Tschumi et al. | 379/395 |
| 3,180,937 | 4/1965 | Moser | 379/395 |
| 3,700,831 | 10/1972 | Aagaard et al. | 379/395 |
| 3,962,553 | 6/1976 | Linder et al. | 379/395 |
| 4,489,442 | 12/1984 | Anderson et al. | 381/110 |
| 4,691,348 | 9/1987 | Braathen | 379/388 |
| 4,918,726 | 4/1990 | Snyder | 379/395 |

Primary Examiner—James L. Dwyer
Assistant Examiner—M. W. Shehata
Attorney, Agent, or Firm—Arnold, White & Durkee

[57] ABSTRACT

An apparatus 10 is employed for interfacing a telephone handset 18 to a telephone network. Typically, a telephone handset has one of a variety of different microphones disposed therein, such as carbon, electret, etc., where each type of microphone has a different output level and impedance. Conversely, the telephone network with which the microphone is to be interfaced has a preselected input impedance and signal requirement intended to match only one type of microphone. The apparatus 10 includes a plurality of switches 82, 84, 86, 88 and resistors 90, 92, 94 that are manually switchable into the circuit either separately or in combination to match the output impedance and signal level of the microphone with the input impedance and signal level of the telephone network. Alternatively, in a second embodiment of the instant apparatus, a variable resistor is employed to match the output impedance and signal level of the microphone with the input impedance and signal level of the telephone network.

18 Claims, 3 Drawing Sheets

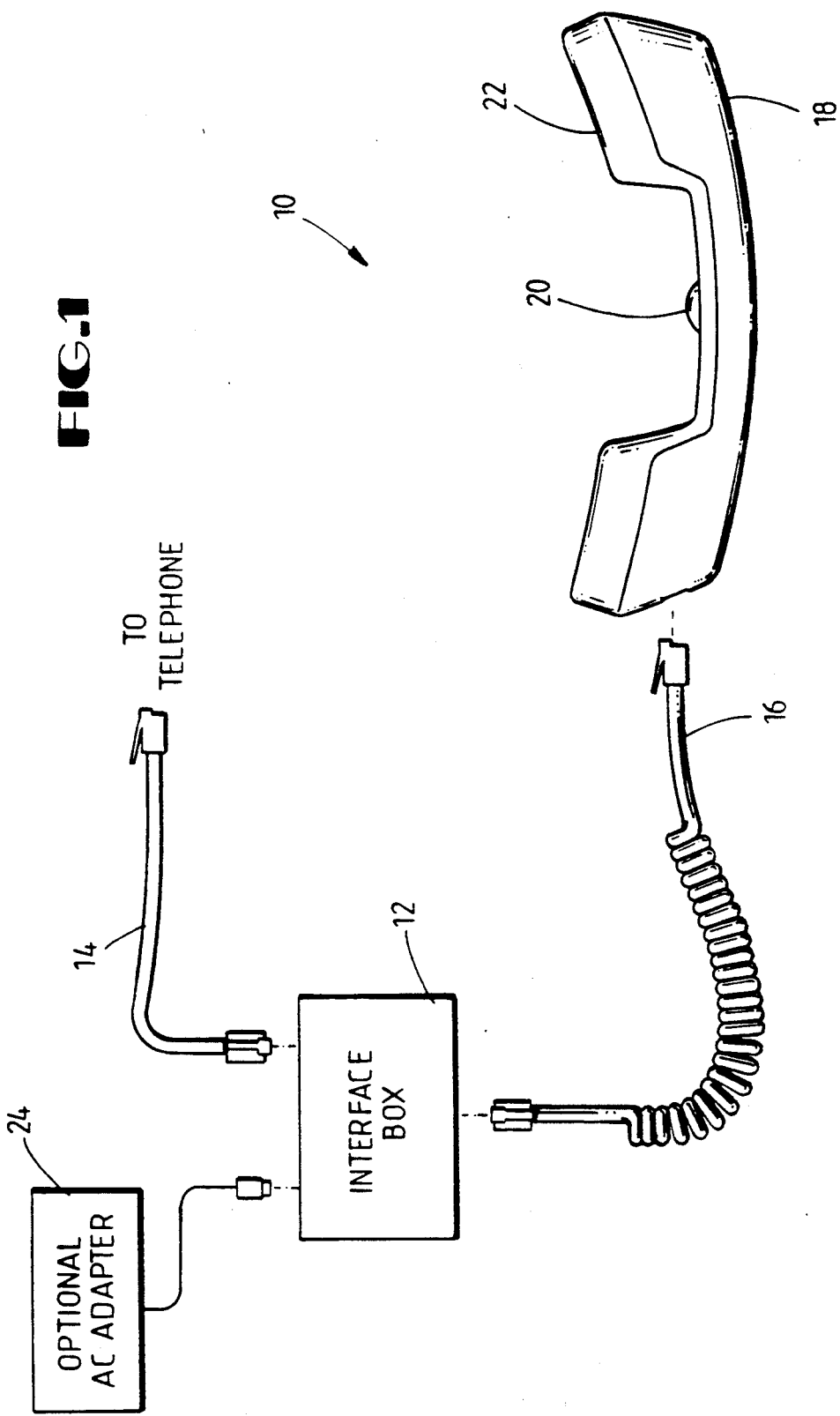

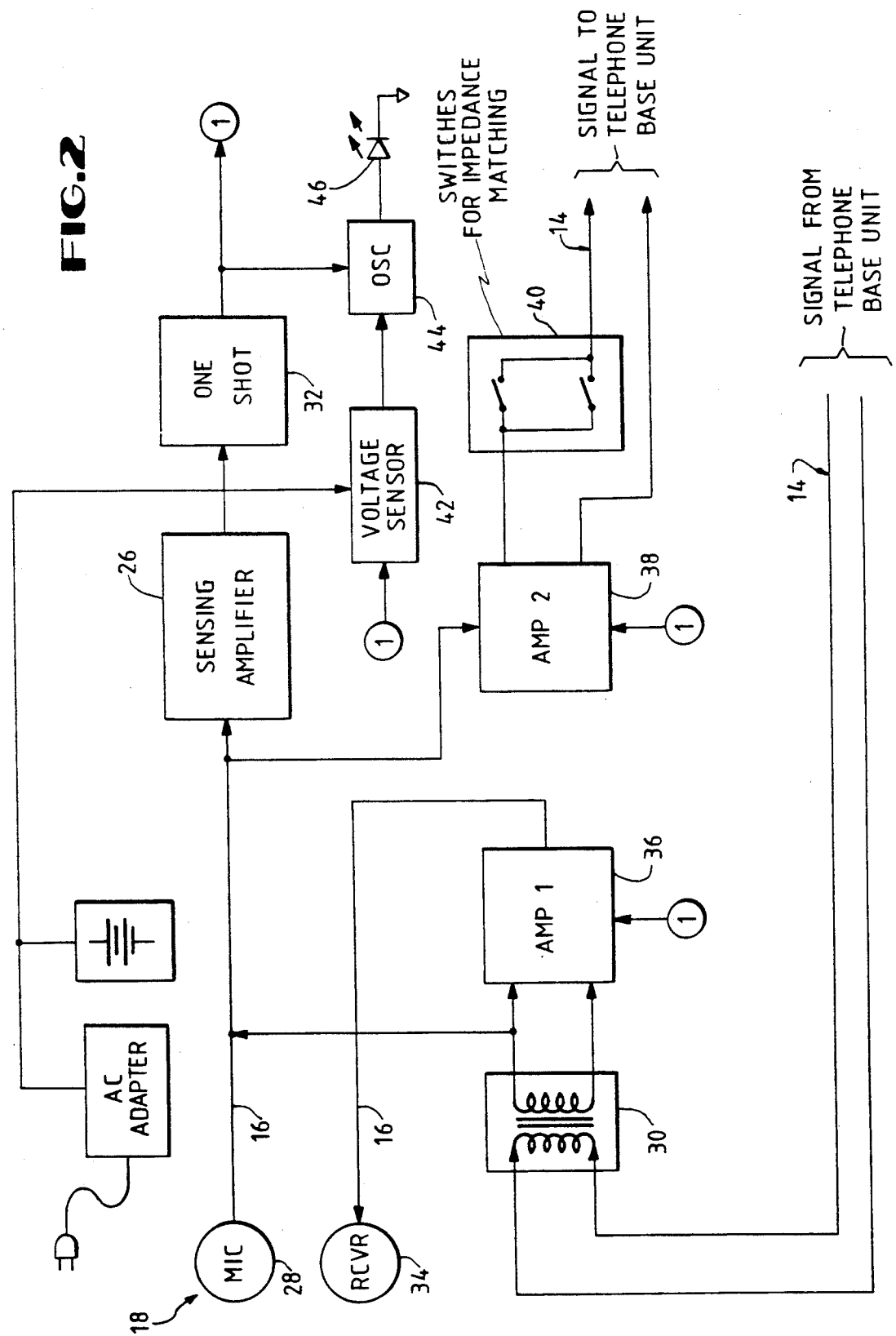

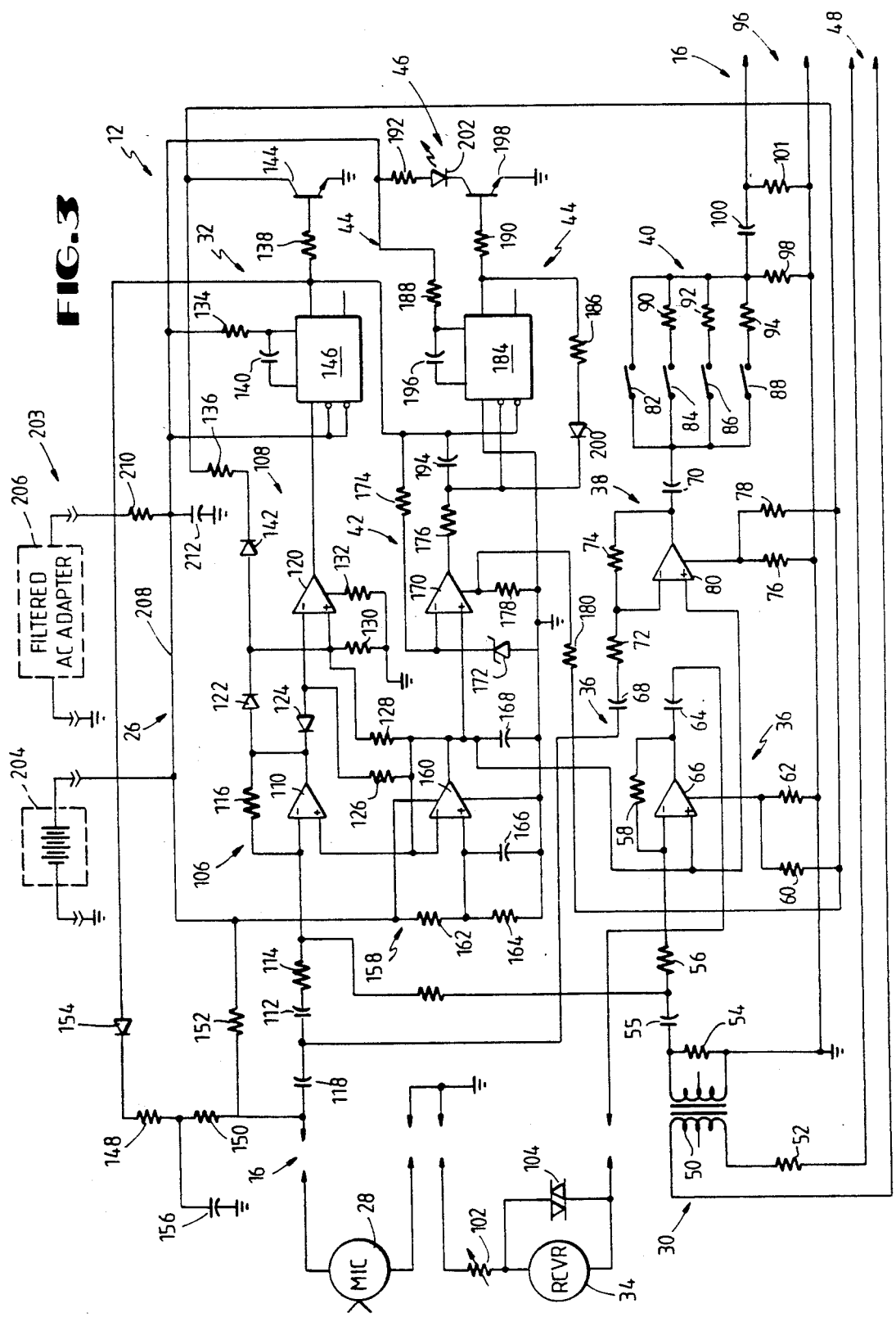

UNIVERSAL TELEPHONE HANDSET INTERFACE

BACKGROUND OF THE INVENTION

1. Field of the Invention

This invention relates generally to an electronic circuit for interfacing a telephone handset to a telephone base unit and, more particularly, to an electronic circuit for interfacing a variety of different telephone handsets to different types of telephone equipment.

2. Description of the Related Art

There exists a great variety of telephone equipment and peripheral devices, such as telephone handsets. Most handsets are made to conform to certain telephone system standards. For example, telephone handsets are normally equipped with carbon, electret, or dynamic type transducers.

Carbon, electret, and dynamic transducers have different electrical characteristics, such as impedance, demand on bias current, and signal magnitude that can vary by as much as 40–60 dB. Telephone handsets are, therefore, equipped with transducers that match their electrical characteristics with the electrical characteristics of the instruments with which the handsets are intended to be used, such as the base unit of a telephone. If telephone handsets are connected to incompatible instruments, unpredictable performance may result, i.e. excess noise, reduced quality of transmissions, etc.

It has been common practice to receive electrical power for the telephone and associated equipment directly from the telephone lines. However, increasingly sophisticated electronics in the telephones have increased the demand for electrical power beyond that available from the telephone lines. Accordingly, transmission quality is in danger of being significantly reduced. Hence, the trend is toward AC and battery powered telephones and peripheral equipment. However, neither AC nor battery power offers an ideal solution. Rather, both suffer from inherent shortcomings.

For example, AC power is not always readily available. Similarly, batteries need to be checked and replaced at relatively frequent intervals; an operation regarded as bothersome by most users.

The present invention is directed to overcoming one or more of the problems set forth above.

SUMMARY OF THE INVENTION

In one aspect of the present invention, an apparatus is provided for interfacing a telephone handset to a telephone network. The telephone handset has one of a variety of different microphones disposed therein, where each of the microphones has a different preselected output signal level. The telephone network is adapted for receiving a preselected signal level. The apparatus includes means for receiving electrical signals generated by the microphone in response to receiving audio signals generated by a user of the handset, and delivering an amplified electrical signal corresponding to the received electrical signal. Further, means receives the amplified electrical signal and matches the output signal level of the microphone with the input signal level of the telephone network.

BRIEF DESCRIPTION OF THE DRAWINGS

Other objects and advantages of the invention will become apparent upon reading the following detailed description and upon reference to the drawings in which:

FIG. 1 illustrates a diagram of a telephone handset, a telephone handset interface device, and connections to a power supply and peripheral telephone equipment;

FIG. 2 illustrates a block diagram of the present invention; and

FIG. 3 illustrates a detailed schematic of the telephone handset interface device.

While the invention is susceptible to various modifications and alternative forms, specific embodiments thereof have been shown by way of example in the drawings and will herein be described in detail. It should be understood, however, that the specification is not intended to limit the invention to the particular forms disclosed therein, but on the contrary, the intention is to cover all modifications, equivalents, and alternatives falling within the spirit and scope of the invention as defined by the appended claims.

DESCRIPTION OF A PREFERRED EMBODIMENT

Turning now to the drawings and referring to FIG. 1, a block diagram of an apparatus 10 is shown. The drawing illustrates the interrelationship between the main components used with an interface device 12. A telephone handset cord 14 connects the telephone interface device 12 to a telephone base unit (not shown). The handset cord 14 transmits signals bidirectionally between the telephone base unit and the handset interface device 12. These signals comprise audio signals and hook switch signals. Hook switch signals originate in a switch (not shown) that is normally activated by removing the telephone handset from a handset cradle on the telephone base unit. The hook switch may be mounted at various locations, such as in the cradle itself, or on the handset. The hook switch may also be manually operated, such as on cordless telephones.

Another cord 16 connects the telephone interface device 12 with a telephone handset 18. The handset 18 is equipped with a volume control 20 to allow the user to adjust the volume of sound in a receiver 22 of the handset 18. The handset receiver 22 converts electrical signals that are transmitted through the handset cord 16 into audible sound.

The interface device 12 is normally powered by batteries (see FIG. 2). Battery power has the advantage of a high degree of mobility, i.e. no extra cables or connections to an AC outlet. However, an optional AC adapter 24 is connected to the interface device 12. The AC adapter has the advantage of eliminating the often bothersome need to replace batteries.

FIG. 2 shows a more detailed block diagram of the telephone interface device 12. The diagram illustrates the main components that form the telephone handset interface device 12. The overall purpose of the interface device 12 is to provide electrical compatibility between the handset 18 and telephone equipment. However, the interface device 12 includes additional circuitry for enhancing the performance of the interface device 12, such as by extending battery life.

The interface device 12 includes means for controllably switching between high-power and low-power modes of operation in response to actual use of the telephone handset 18. In other words, when a user of the telephone handset is speaking into the handset is, the interface device 12 switches into the high-power mode of operation to provide a high-quality, amplified representation of the user's voice to the telephone network. Conversely, when the no communications are occurring through the handset, the interface device 12 switches into the low-power mode of operation so as to conserve battery power and extend the useful life of the battery.

A sensing amplifier 26 monitors a microphone 28 in a transmitter of the handset 18, signals received from the telephone network, and a hook switch (not shown) in the telephone base unit (not shown). Signals from the hook switch and the telephone network are coupled to the sensing amplifier 26 through an impedance matching transformer 30. Similarly, the output of the microphone 28 is also coupled to the sensing amplifier 26. The sensing amplifier 26 delivers a signal to a one-shot multivibrator 32 in response to detecting voice (audio) signals from the microphone 28 or the telephone network or a hook switch signal, "spike", delivered from the telephone base unit through the handset cord 16 and the transformer 30.

The one-shot 32 leaves its dormant state (i.e., low-power mode) and enters an active state (i.e., high-power mode) when a signal from the sensing amplifier 26 is received. The one-shot 32 remains in its active state for a preselected period of time to prevent the interface device 12 from continually cycling "on" and "off." Subsequent detections of user activity (i.e. use of the telephone handset 18) retriggers the one-shot 32 and causes it to return to or remain in the active state.

The one-shot 32 controls the power consumption of the active circuits in the interface 12 by regulating the supply current. Such active devices comprise operational amplifiers, multivibrator circuits, etc. Only a limited amount of current is available during the dormant states so as to conserve battery power.

The transformer 30 also supplies a receiver 34 with the voice signal from the telephone network through an input amplifier 36. The input amplifier 36 compensates for signal losses and enhances the quality of the voice signal delivered to the receiver 34.

To serve its primary function of interfacing the handset 18 with a wide variety of telephone equipment, the microphone 28 is connected to an output amplifier 38 to provide a signal amplitude suited for a telephone network. A set of switches 40 is included between the output amplifier 38 and the telephone lines to further improve signal quality by means of signal level matching the microphone 28 with the telephone network. The switches 40 can be set to any of a variety of combinations by the user, depending upon the type of equipment with which the handset 18 is to be interfaced.

The interface device 12 includes an additional feature to ensure proper and continued operation of the battery power source by indicating when the battery is discharged. The interface device 12 continually monitors the supply voltage during the active state. This process is performed to warn a user of the interface 12 that the battery charge is "low." The monitoring process is performed by a voltage sensor 42 and an oscillator 44. The voltage sensor 42 signals the oscillator 44 upon detecting a low voltage condition. A low voltage condition is a measure of the state of charge in the battery.

The oscillator 44 indicates a low battery condition by flashing an LED 46. The LED 46 only flashes while the handset 18 is in use and most likely to be detected by the user. The output signal from the one-shot 32 is delivered to the oscillator 44 to enable the oscillator 44 to flash the LED 46 when a voice signal or a switch hook signal is detected. Thus, the LED 46 flashes when the user is most likely to observe the warning signal.

A detailed electrical schematic of one embodiment of the telephone handset interface 12 is shown in FIG. 3. A first pair of conductors 48 form a portion of the cord 14 extending between the telephone base unit (not shown) and the interface device 12. The first pair of conductors 48 are connected to a transformer 50, which forms a portion of the impedance matching transformer 30. The first pair of conductors 48 carry input signals to the interface 12 from the telephone network.

A resistor 52 is serially connected between one of the terminals of the transformer 50 and the first pair of conductors 48. The polarity of the transformer terminals and the first pair of conductors 48 is inconsequential. A resistor 54 is connected in parallel with the secondary side of the transformer 50. The transformer 50 matches the impedance between the signal source (telephone network) and the interface device 12.

The transformer 50 is also connected to the input amplifier 36 through a decoupling capacitor 55. The decoupling capacitor 55 isolates the transformer 50 from any DC component from the input of the operational amplifier 66. The input amplifier 36 comprises four resistors 56, 58, 60, 62, a second decoupling capacitor 64, and an operational amplifier 66. The first resistor 56 is connected between the decoupling capacitor 55 and the inverting input of the operational amplifier 66. The second resistor 58 is connected between the output and the inverting input of the operational amplifier 66. The first and second resistors 56, 58 form a voltage divider that determines the gain of the input amplifier 36.

The third and fourth resistors 60, 62 determine the operating current in the active and passive modes of operation of the interface 12. The fourth resistor 62 is connected between the biasing terminal of the operational amplifier 66 and ground, and determines the operating current during the passive mode. The third resistor 60 is connected to the biasing terminal of the operational amplifier 66 and the output of the one-shot 32. The third resistor 6 is effectively connected in parallel with the fourth resistor 66 during active modes of operation by the one-shot 32, thereby increasing the operating current. The second decoupling capacitor 64 is connected between the output of the operational amplifier 66 and the receiver 34.

The receiver 34 has additional components included therein so as to enhance its operation. As discussed in connection with FIG. 1, the volume control 20 allows the user to adjust the volume of the voice signal to a desired level. The volume control 20 is connected to ground through a variable resistor 102. A varistor 104 is also included to "clip" signal spikes in the receiver 34. The varistor 104 is connected in parallel with the receiver 34.

The output amplifier 38 is connected between the microphone 28 and the switches 40. The output amplifier 38 comprises two decoupling capacitors 68, 70, four resistors 72, 74, 76, 78, and an operational amplifier 80. The decoupling capacitor 68 connects the microphone 28 to the resistor 72. The resistor 72 is, in turn, connected to the inverting input of the operational amplifier 80. The decoupling capacitor 70 is connected between the output of the operational amplifier 80 and the switches 40. Both capacitors 68, 70 serve to eliminate any DC components in the input and output signals to and from the operational amplifier 80, respectively. The resistor 74 is connected between the inverting input and the output of the operational amplifier 80. The two resistors 72, 74 form a voltage divider and determine the gain of the operational amplifier 80.

The third resistor 76 in the output amplifier 38 is connected between the bias terminal of the operational amplifier 80 and ground, and sets the bias current and power consumption during the passive mode. The last resistor 78 is connected between the bias terminal of the operational amplifier 80 and the output of the one-shot 32. The parallel combination of the third and fourth resistors 76, 78 determines the bias current and power consumption of the operational amplifier 80 during the active mode of operation.

The impedance matching switches 40 comprise a plurality of switches 82, 84, 86, 88 serially connected to resistors 90, 92, 94. The resistor/switch combinations are connected in parallel. Any number of switches may be used, but four switches are shown for illustrative purposes. Alternatively, in another embodiment of the instant apparatus, a variable resistor (not shown) is substituted for the parallel arrangement of switches 82, 84, 86, 88 and resistors 90, 92, 94. The variable resistor allows the user to "dial in" the appropriate signal level to match the microphone signal level to the telephone equipment and to obtain a desired acoustic level.

The first switch 82 is connected between the output amplifier 38 and a set of output terminals 96 of the telephone interface device 12. The output terminals 96 form a portion of the cord 14 extending between the interface 12 and base unit. The first switch 82, when closed, provides a "straight path" for the maximum output signals. Thus, it alone is closed when the signal level produced by the operational amplifier 80 already matches the telephone network. This "match" typically occurs when the network is a carbon compatible type.

Alternatively, when the signal level expected by the telephone network does not match the signal level delivered by the microphone 28, one, or a combination of, the remaining switches is manually closed. The second switch 84 is connected in series with the resistor 90 between the output amplifier 38 and the output terminals 96 of the interface device 12. The third switch 84 and its associated resistor 92, along with the fourth switch 86 and its associated resistor 94, are connected in a similar fashion.

An additional resistor 98 forms a voltage divider with the resistors 90, 92, 94. The resistor 98 is connected across the output terminals 96. Thus, the voltage drop induced across the terminals 96 is a direct function of the combination of the resistors 90, 92, 94.

An additional decoupling capacitor 100 is connected in series with the resistor/switch combinations and the output terminals 96. The decoupling capacitor 100 eliminates any DC components of the signal delivered to the telephone network. A resistor 101 operates to allow a relatively small DC current to flow therethrough. This small DC current prevents the telephone base unit from being "fooled" into believing that the handset 18 is not connected thereto.

The sensing amplifier 26 mainly consists of two components, an amplifier 106 and a comparator 108. The amplifier 106 comprises an operational amplifier 110, a decoupling capacitor 112, and two resistors 114, 116. The decoupling capacitor 112 is serially connected through another decoupling capacitor 118 to the microphone 28, with its other terminal connected to the resistor 114. The resistor 114 is, in turn, connected to the inverting input of the operational amplifier 110. The second resistor 116 is connected between the output and the inverting input of the operational amplifier 110. The two resistors 114, 116 form a voltage divider and determine the gain of the amplifier 106.

The comparator 108 provides the one-shot 32 with signals that have relatively sharp transitions to ensure proper triggering. The comparator 108 comprises an operational amplifier 120, two diodes 122, 124, and four resistors 126, 128, 130, 132. The first resistor 126 provides the operational amplifier 120 with biasing at approximately half the supply voltage. The resistor 126 is connected between virtual ground and the inverting input of the operational amplifier 120. The second and third resistors 128, 130 form a voltage divider that provides the operational amplifier 120 with biasing at slightly less than half the supply voltage. The second resistor 128 is connected between virtual ground and the non-inverting input of the operational amplifier 120. The third resistor 130 is connected between the non-inverting input of the operational amplifier 120 and ground.

The fourth resistor 132 is connected between the current programming terminal of the operational amplifier 120 and ground. This last resistor 132 determines the power consumption of the operational amplifier 120. It should be noted that, unlike the operational amplifiers 66, 80, the one-shot 32 does not control switching of the operational amplifier 120 between the high and low-power modes of operation. Rather, since the operational amplifier 120 operates to detect when the handset 18 is being used, it should preferably be operational at all times.

The first diode 122 is connected between the output of the operational amplifier 110 and the non-inverting input of the operational amplifier 120. The first diode 122 provides the operational amplifier 120 with signals at its non-inverting input that have positive polarity only. These positive polarity signals result in pulses with positive polarity at the output of the operational amplifier 120. The second diode 124 provides the operational amplifier 120 with signals at the inverting input that have negative polarity only. The signals with negative polarity also result in pulses with positive polarity at the output of the operational amplifier 120.

The one-shot 32 comprises three resistors 134, 136, 138, a capacitor 140, a diode 142, a transistor 144, and an integrated monostable multivibrator 146. The first resistor 134 and the capacitor 140 form an RC circuit that determines the time duration of the output signal from the one-shot 32. The capacitor 140 is connected in parallel between the timing terminals of the monostable multivibrator 146. The resistor 134 is connected between one of the timing terminals and the supply voltage.

The second resistor 136 and the diode 142 serve to reduce the sensitivity of the sensing amplifier 26 during the active mode. This reduced sensitivity reduces the susceptibility to false triggering due to background noise. The diode 142 and the second resistor 136 are serially connected between the non-inverting input of the comparator operational amplifier 120 and the collector of the transistor 144.

The third resistor 138 is connected to the output of the monostable multivibrator 146 and provides the transistor 144 with a biasing current. The transistor 144 provides buffering for the monostable multivibrator 146, (i.e. it is able to control a larger current). The buffering transistor 144 controls the operating current to the input amplifier 36, the output amplifier 38, and the oscillator 44. That is, the transistor 144 is fully turned "on" during the active mode, and completely turned "off" during the passive or dormant mode of operation.

The combination of three resistors 148, 150, 152, a diode 154, and a capacitor 156 provides the electret microphone 28 with a bias current during the dormant and the active modes of operation. The bias current is substantially smaller during the passive, or dormant, mode, compared to the active mode. Further, a "soft" turn "off" is provided to reduce the chances of false triggering during a rapid turn off. The diode 154 is serially connected with the first and second resistors 148, 150 between the output of the monostable multivibrator 146 and the microphone 28. This combination provides the microphone 28 with a bias current during the active mode. The capacitor 156 connects the junction of the first and second resistors 148, 150 to ground.

The third resistor 152 provides the microphone 28 with a small bias current during the passive, or dormant, mode of operation. The third resistor 152 is connected between the microphone 28 and the power supply. The combination of the first and second resistors 148, 150 and the capacitor 156 forms the "soft" turn off. The first and second resistors 148, 150 and the capacitor 156 form an RC Circuit, which reduces the current supplied to the microphone 28 over a longer period of time than simply switching between the two current levels.

A virtual ground circuit 158 establishes a voltage at approximately one-half the supply voltage. This voltage is used by the other circuits in the interface device 12 as ground potential. This configuration allows proper circuit operation with a unipolar power supply (i.e. one rather than two batteries will suffice).

The virtual ground circuit 158 comprises an operational amplifier 160, two resistors 162, 164, and two capacitors 166, 168. The two resistors 162, 164 are of approximately equal resistance and are serially connected between the supply voltage and ground. The junction of the two resistors 162, 164 has a potential of one half the supply voltage and is delivered to the non-inverting input of the operational amplifier 160. The operational amplifier 160 is connected as a unity gain buffer. That is, its output terminal is connected to its inverting input terminal. The output terminal maintains a voltage substantially equal to the voltage at the non-inverting input terminal but with a substantially lower impedance. The two capacitors 166, 168 are connected to the non-inverting input and the output of the operational amplifier 160, respectively. The two capacitors 166, 168 provide an additional low impedance AC signal path between the virtual ground and the ground terminal.

The voltage sensor 42 continually monitors the supply voltage during the active mode. The voltage sensor 42 signals the oscillator 44 upon detecting a "low" supply voltage. The oscillator 44 provides the light emitting diode (LED) 46 with a pulse train that causes the LED 46 to flash and catch a user's attention.

The voltage sensor 42 comprises an operational amplifier 170, a zener diode 172, and three resistors 174, 178, 180. The zener diode 172 and the first resistor 174 establish a reference voltage as long as the output from the one-shot 32 is active. The first resistor 174 is connected between the output of the one-shot 32 and the cathode of the zener diode 172. The zener diode 172 is connected with its anode to ground and its cathode to the inverting input of the operational amplifier 170.

The second and third resistors 178, 180 determine the operating current (i.e. power consumption) during the active and passive (or dormant) modes of operation. The second resistor 178 is connected between the current programming terminal of the operational amplifier 170 and ground to set the current in the dormant mode of operation. The third resistor 180 is connected between the current programming terminal of the operational amplifier 170 and the output (i.e. collector) of the transistor 144. The parallel combination of the third and the fourth resistors 178, 180 determines the operating current (i.e. power consumption) of the operational amplifier 170 in the active mode of operation.

The oscillator circuit 44 comprises an astable multivibrator 184, five resistors 176, 186, 188, 190 192, Capacitors 194, 196, a buffer transistor 198, a diode 200, and an LED 202. The astable multivibrator 184 is controlled by the operational amplifier 170 through the resistor 176. The first capacitor 194, the resistor 186 and the diode 200 form a first RC time constant that determines the "off" cycle of the oscillator 44. The first capacitor 194 is connected between the inverting trigger input of the astable multivibrator 184 and the output of the monostable multivibrator 146. The diode 200 is serially connected with the resistor 186 between the inverting trigger input and the output of the astable multivibrator 184.

The resistor 188 and the capacitor 196 form a second RC circuit that determines the "on" cycle of the oscillator 44. The resistor 188 is connected between the supply voltage and the RC input of the astable multivibrator 184. The capacitor 196 is connected between the RC input of the astable multivibrator 184 and ground.

The resistor 190 is connected between the output of the astable multivibrator 184 and the base of the buffer transistor 198 to establish a proper base current to the transistor 198. The resistor 192 is connected between the supply voltage and the anode of the LED 202, establishing a proper collector current for the buffer transistor 198. The LED 202 is connected between the fourth resistor 192 and the collector of the buffer transistor 202. The buffer transistor 202 switches "on" and "off" according to the output pulses from the astable multivibrator 184. The switching action of the buffer transistor 202 results in current pulses through the LED 202 that emit pulses of visible light.

Power is supplied to the interface circuit 12 by a power supply 203. The power supply 203 comprises one or more batteries 204, or a filtered AC adapter 206. The batteries 204 are connected to a supply voltage connector 208. The filtered AC adapter 206 is connected through a resistor 210 to the supply voltage connector 208. A capacitor 212 is connected between the supply voltage connector 208 and ground to reduce "spikes", transients, 60 cycle "hum," etc.

We claim:

1. An apparatus for interfacing a telephone handset to a telephone network, said telephone handset having one of a variety of different microphones disposed therein, each of said microphones having a different preselected output signal level and said telephone network being adapted for receiving a preselected signal level, said apparatus comprising:

means for receiving electrical signals generated by said microphone in response to receiving audio signals generated by a user of said handset, and delivering an amplified electrical signal corresponding to said received electrical signal; and means for receiving the amplified electrical signal and matching the output signal level of the microphone with the input signal level of the telephone network, comprising:

a plurality of switches, each having a first terminal adapted to receive said amplified electrical signal and a second terminal respectively connected to a first terminal of a plurality of resistors, and each of said plurality of resistors having a second terminal connected together.

2. An apparatus, as set forth in claim 1, wherein said plurality of switches includes at least one switch having its first terminal adapted to receive said amplified electrical signal and a second terminal connected to the second terminals of said plurality of resistors.

3. An apparatus, as set forth in claim 2, wherein said plurality of switches are adapted to be manually closed and opened in any combination.

4. An apparatus, as set forth in claim 1, wherein said telephone handset includes means for receiving electrical signals from said telephone network and converting said electrical signals to audio signals, said apparatus including power conserving means for operating said apparatus in a high-power mode of operation in response to detecting the presence of electrical signals being delivered by at least one of said microphone and said telephone network and for operating said apparatus in a low-power mode of operation in response to detecting the absence of electrical signals being delivered by said microphone and said telephone network.

5. An apparatus, as set forth in claim 4, wherein said power conserving means includes a timer means for continuing to operate said apparatus in said high-power mode of operation for a preselected duration of time after detecting the presence of electrical signals being delivered by at least one of said microphone and said telephone network.

6. An apparatus, as set forth in claim 1, including a battery adapted for providing electrical power to said apparatus and a detector means for comparing the voltage level of said battery to a preselected voltage level and delivering a low-voltage indicator signal in response to said battery voltage level being less than said preselected voltage level.

7. An apparatus, as set forth in claim 6, including means for detecting the presence of electrical signals being delivered by at least one of said microphone and said telephone network and delivering an activity signal in response thereto, and means for indicating a low battery voltage in response to receiving said low-voltage indicator signal and said activity signal whereby said low battery voltage indicating means is operated only when a user is operating the handset.

8. An apparatus for interfacing a telephone handset to a telephone network, said telephone handset having one of a variety of different microphones disposed therein, each of said microphones having a different preselected output signal level and said telephone network being adapted for receiving a preselected input signal level, said apparatus comprising:

means for receiving electrical signals generated by said microphone in response to receiving audio signals generated by a user of said handset, and delivering an amplified electrical signal corresponding to said received electrical signal; and a plurality of switches, each of a first portion of said plurality of switches having a first terminal adapted to receive said amplified electrical signal and a second terminal respectively connected to a first terminal of a plurality of resistors, and each of said plurality of resistors having a second terminal connected together, at least one of said plurality of switches having a first terminal adapted to receive said amplified electrical signal and a second terminal connected to the second terminals of said plurality of resistors, whereby said plurality of resistors and switches being adapted to match the output signal level of the microphone with the input signal level of the telephone network.

9. An apparatus, as set forth in claim 8, wherein said plurality of switches are adapted to be manually closed and opened in any combination.

10. An apparatus, as set forth in claim 8, wherein said telephone handset includes means for receiving electrical signals from said telephone network and converting said electrical signals to audio signals, said apparatus including power conserving means for operating said apparatus in a high-power mode of operation in response to detecting the presence of electrical signals being delivered by at least one of said microphone and said telephone network and for operating said apparatus in a low-power mode of operation in response to detecting the absence of electrical signals being delivered by said microphone and said telephone network.

11. An apparatus, as set forth in claim 10, wherein said power conserving means includes a timer means for continuing to operate said apparatus in said high-power mode of operation for a preselected duration of time after detecting the presence of electrical signals being delivered by one of said microphone and said telephone network.

12. An apparatus, as set forth in claim 8, including a battery adapted for providing electrical power to said apparatus and a detector means for comparing the voltage level of said battery to a preselected voltage level and delivering a low-voltage indicator signal in response to said battery voltage level being less than said preselected voltage level.

13. An apparatus, as set forth in claim 12, including means for detecting the presence of electrical signals being delivered by at least one of said microphone and said telephone network and delivering an activity signal in response thereto, and means for indicating a low battery voltage in response to receiving said low-voltage indicator signal and said activity signal whereby said low battery voltage indicating means is operated only when a user is operating the handset.

14. An apparatus for interfacing a telephone handset to a telephone network, said telephone handset having one of a variety of different microphones disposed therein, each of said microphones having a different preselected output signal level and said telephone network being adapted for receiving a preselected signal level, said apparatus comprising:

means for receiving electrical signals generated by said microphone in response to receiving audio signals generated by a user of said handset, and delivering an amplified electrical signal corresponding to said received electrical signal; and a variable resistor adapted for receiving the amplified electrical signal and matching the output signal level of the microphone with the input signal level of the telephone network.

15. An apparatus, as set forth in claim 14, wherein said telephone handset includes means for receiving electrical signals from said telephone network and converting said electrical signals to audio signals, said apparatus including power conserving means for operating said apparatus in a high-power mode of operation in response to detecting the presence of electrical signals being delivered by at least one of said microphone and said telephone network and for operating said apparatus in a low-power mode of operation in response to detecting the absence of electrical signals being delivered by said microphone and said telephone network.

16. An apparatus, as set forth in claim 15, wherein said power conserving means includes a timer means for continuing to operate said apparatus in said high-power mode of operation for a preselected duration of time after detecting the presence of electrical signals being delivered by at least one of said microphone and said telephone network.

17. An apparatus, as set forth in claim 14, including a battery adapted for providing electrical power to said apparatus and a detector means for comparing the voltage level of said battery to a preselected voltage level and delivering a low-voltage indicator signal in response to said battery voltage level being less than said preselected voltage level.

18. An apparatus, as set forth in claim 17, including means for detecting the presence of electrical signals being delivered by at least one of said microphone and said telephone network and delivering an activity signal in response thereto, and means for indicating a low battery voltage in response to receiving said low-voltage indicator signal and said activity signal whereby said low battery voltage indicating means is operated only when a user is operating the handset.

* * * * *